May 7, 1940.  A. W. DE VOUT  2,199,485
FOOD STORAGE
Filed May 13, 1936   3 Sheets-Sheet 1

WITNESS-
Wm C. Meiser

Anson W. DeVout
INVENTOR

BY
ATTORNEY

May 7, 1940.  A. W. DE VOUT  2,199,485
FOOD STORAGE
Filed May 13, 1936  3 Sheets-Sheet 2

Anson W. De Vout
INVENTOR

WITNESS-

May 7, 1940.  A. W. DE VOUT  2,199,485
FOOD STORAGE
Filed May 13, 1936   3 Sheets-Sheet 3
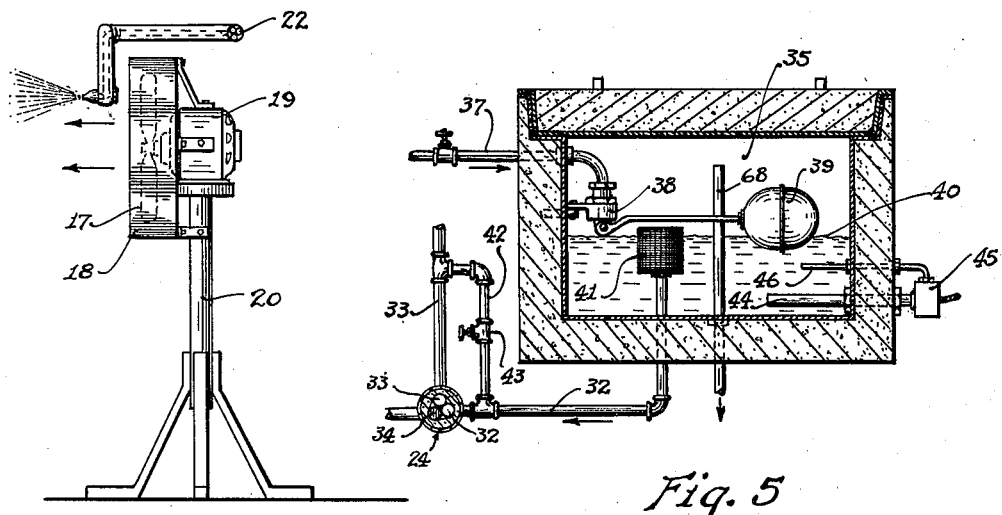
Fig. 4
Fig. 5
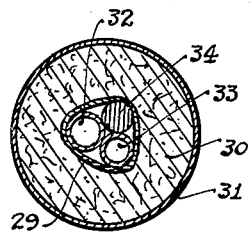
Fig. 7
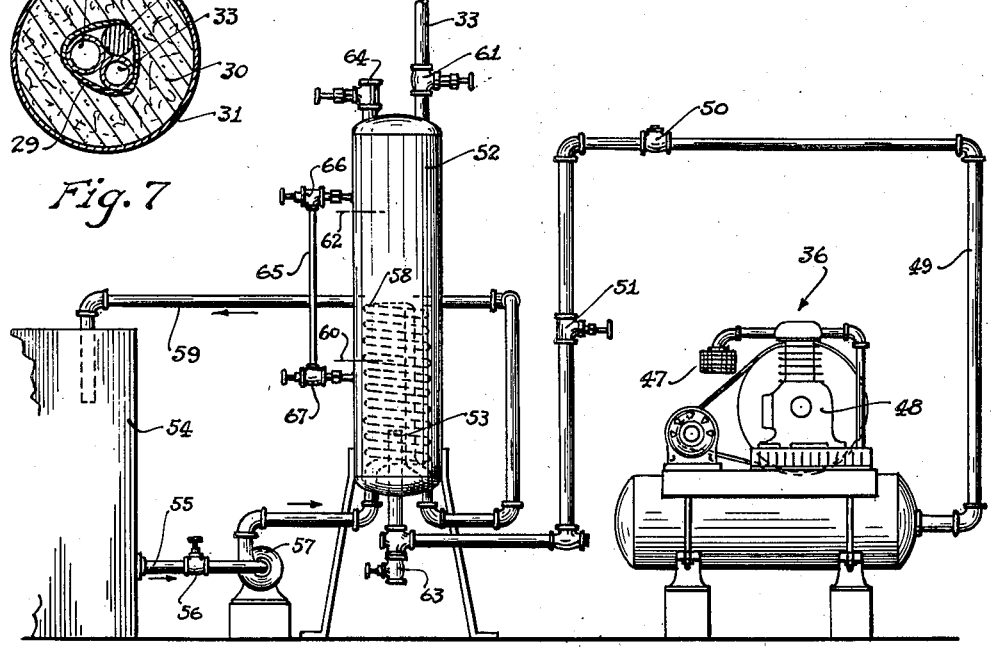
Fig. 6
Anson W. De Vout
INVENTOR
WITNESS —
Wm. C. Meiser
BY
ATTORNEY Patented May 7, 1940

2,199,485

UNITED STATES PATENT OFFICE 2,199,485

FOOD STORAGE

Anson W. De Vout, La Grange, Ill., assignor to Industrial Patents Corporation, Chicago, Ill., a corporation of Delaware Application May 13, 1936, Serial No. 79,592

5 Claims. (Cl. 261—1)

This invention relates to method and means for controlling the moisture content of the atmosphere in refrigerated chambers and is applicable to all types of refrigerated chambers, especially in which temperatures below the freezing point of water are carried. According to the invention, the humidity of the atmosphere within the refrigerated chamber is raised or lowered by the controlled introduction of water in the form of a fine mist at selected points within the chamber.

One of the objects of the invention is to provide an improved method of humidifying refrigerated chambers in which water in the form of a mist is introduced and circulated within the chamber at a sufficiently high rate to suspend finely divided supercooled water in the atmosphere of the chamber.

Another object of the invention is to provide means for introducing and circulating water within a refrigerated chamber in the form of a fine mist and at a sufficiently high rate to suspend finely divided supercooled water in the atmosphere of the chamber.

Although at normal pressures water crystallizes into ice at temperatures below thirty-two degrees Fahrenheit, this is not necessarily true of a water mist or fog. On the contrary, the introduction of water may be controlled to the end that a water mist or fog is carried in the atmosphere of the refrigerated chamber as supercooled water, that is, water in a liquid state at temperatures below thirty-two degrees Fahrenheit, with the result that there is obtained a high vapor pressure which exceeds the saturation vapor pressure over ice.

The supercooled water carried in the air progressively crystallizes and progressively decreases as a humidity factor and to this end the invention takes into consideration two humidity factors, namely, the humiditfying effect on the atmosphere of the suspended supercooled moisture introduced in the form of a mist, fog, or cloud, whereby there exists a condition comparable to the presence of a fog or cloud on a day when the temperature is below freezing, and the humidifying effect caused by sublimation of the formed ice crystals.

At high temperatures, for example, at thirty degrees Fahrenheit, the two humidity factors normally are substantially equally effective in so far as the air is concerned, and an intermittent spray of mist is sufficient to maintain the desired humidity. At lower temperatures, for example, at zero degrees Fahrenheit sublimation is substantially negligible as a humidity factor and a substantially continuous introduction of mist of supercooled water is necessary to maintain a relatively high humidity.

In the refrigeration of certain products, for example, in the refrigeration of eggs in which the refrigeration chamber is maintained at approximately thirty degrees Fahrenheit, a further factor must always be considered in commercial practice, namely, the presence of hygroscopic material.

The effect of hygroscopic material in the refrigeration chamber will be best understood by consideration of a specific example. Eggs placed in storage are conventionally packed in wooden cases, each individual egg being held in a separate cell defined by fillers and flats of pulp paper or fibrous material. It is well known that eggs so packed and stored in a conventional refrigerated chamber at from twenty-eight to thirty-two degrees Fahrenheit tend to give up their moisture with a resultant loss in weight and quality. It has been proposed from time to time to employ various means for raising the humidity of egg storage chambers to counteract the tendency of the eggs to shrink. The difficulty, however, is that the atmosphere of an egg storage room in itself is not the sole determining factor of the rate of shrink of the eggs. It is true that if other conditions are controlled, the humidity of the atmosphere may be a measure of optimum conditions, but it is also true that the same relatively ideal humidity of the atmosphere may be maintained and yet due to failure to control other conditions heavy shrink losses will be suffered.

It is not so much a question of the humidity of the atmosphere as it is a question of the source of that humidity. If the humidity of the room is maintained solely through sublimation of ice and snow as by the introduction of water which is promptly frozen, the humidity may be maintained at a seemingly ideal point without affecting to any substantial extent the rate of egg shrink. It has been proposed to introduce water into an egg storage chamber in a liquid condition so finely divided that it will not only float but almost instantly freeze. It is true, as has been suggested by some workers in the art, that the ice so formed will subsequently sublimate or vaporize and that the resultant vapor will maintain the desired humidity in the storage room. Although any degree of humidity can be secured up to the point of saturation by any standard of measuring, even the saturation point will be ineffective to prevent substantial shrink of eggs during the early period of storage. It is found that this is due to the fact that the hygroscopic material of the egg case, fillers and flats, form what may be termed a humidity screen. This humidity screen is effective to absorb the vaporized moisture. Due to the high water content of the eggs, by reason of which the eggs constantly give off water vapor by evaporation through the shell, unless the immediately surrounding atmosphere is sufficiently humidified to provide a vapor pressure high enough to inhibit such evaporation, water vapor is absorbed from the egg side of the humidity screen as well as from the outside or room side of the humidity screen.

Notwithstanding the prior art teachings which have been mentioned, it has been found in practice that the shrink of eggs may not be satisfactorily reduced by the mere control of the humidity of the chamber air. Methods which rely solely upon humidity control, may have some beneficial effect, but the effect is of relatively small degree. Such methods have ignored the presence of the humidity screen.

The present invention involves a method which secures all the benefits of what might be termed the "mere humidity methods", and in addition secures remarkable results which cannot be secured by such methods. In the present discovery, the humidity of the atmosphere is employed as a measure of the optimum of moisture conditions and vapor pressure but as a secondary rather than a primary consideration. The primary consideration is to satisfy the hygroscopic effect of the humidity screen as quickly as possible and thus prevent the screen effect of the hygroscopic material which tends to keep the egg containing cells at a lower humidity than the outer atmosphere of the room and thus to render the originally hygroscopic material substantially nonhygroscopic by saturation.

The present invention, however, is not only effective for egg storage but is equally effective in preventing freezer burns and pock marks, for example, on poultry. In lower temperature refrigerated chambers, such as poultry freezers and the like, carried at temperatures of approximately zero degrees Fahrenheit, the rate of sublimation of ice crystals is so low as to be ineffective in maintaining a satisfactory humidity. Consequently, those methods of humidification which rely upon sublimation of ice crystals are entirely ineffective for this purpose.

In the lower temperature rooms, spraying is continued constantly in order that supercooled moisture in the form of a mist is always present in the atmosphere providing what is practically a saturated atmospheric condition. Some of the moisture in low temperature rooms of this type crystallizes to ice and snow promptly upon the formation of the mist. The supercooled moisture progressively crystallizes, some forming ice and snow and some of the supercooled moisture evaporates to form a vapor which in turn condenses on the product. This condensation together with the deposit of preformed ice crystals forms an incrustation of ice and snow which it is found is particularly valuable as a protective covering against the desiccation of frozen food products that have not been wrapped or otherwise shielded from desiccation by packaging.

Specific embodiments of the apparatus of the present invention and of devices which may be employed in carrying out the method of this invention are illustrated in the accompanying drawings in which similar reference characters in the several figures indicate identical parts.

Figure 4 is an elevation taken on a line 4—4 of Figure 3.

Figure 5 is a side view, partly in section, of a water supply tank equipped with a heat element and a float valve.

Figure 6 is an elevation of equipment for compressed air dehumidification and is employed in such installations.

Figure 7 is a cross sectional view of a supply line.

Figure 1:
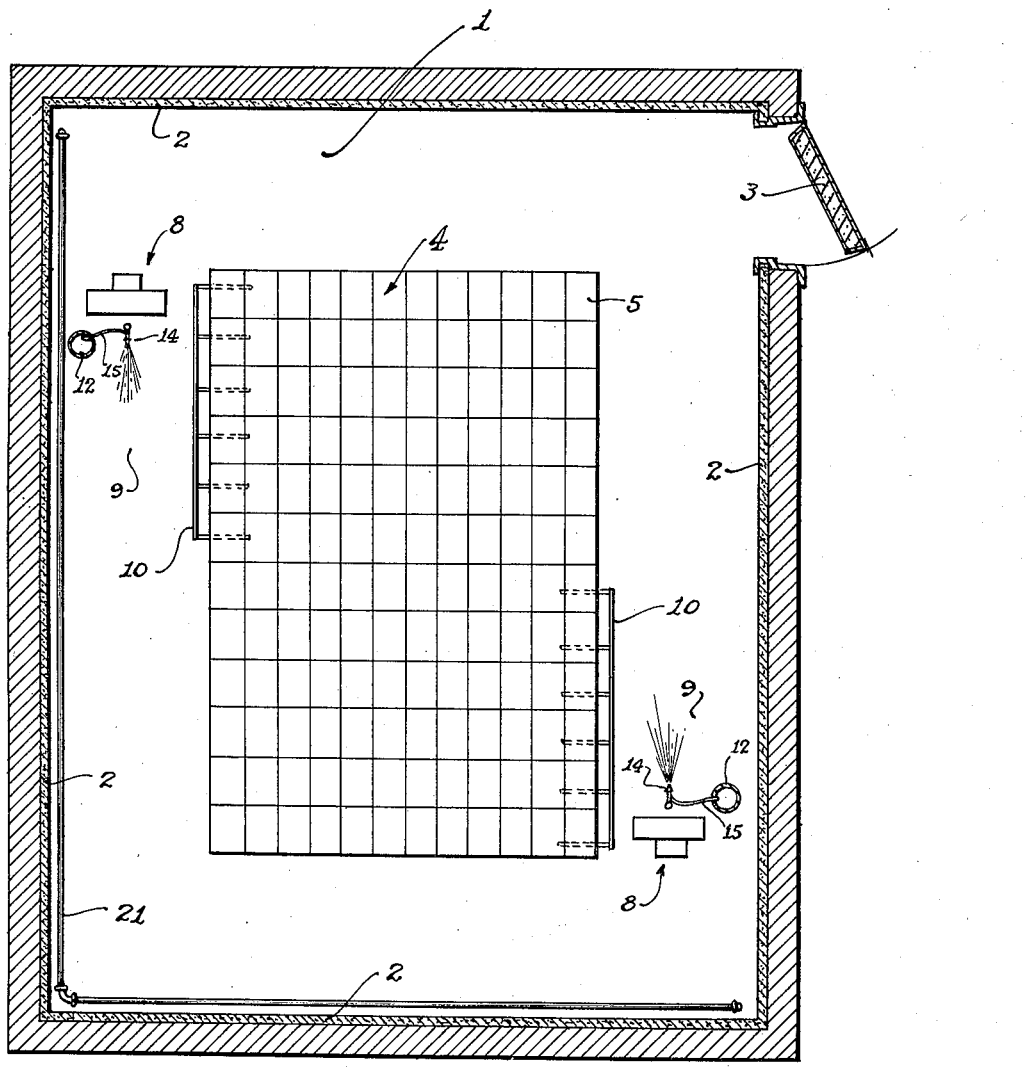
Figure 1 is a plan view of an egg storage room equipped with simple equipment for carrying out the method of the present invention.
Figure 2:
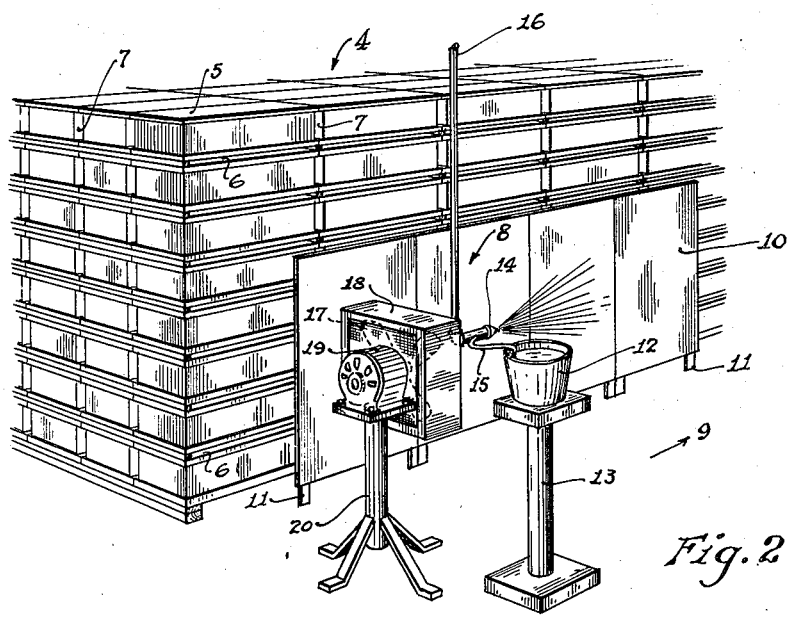
Figure 2 is a perspective view of a pile of egg cases in a refrigerated chamber showing the manner of stacking cases to secure effective circulation and a single mist forming unit of the type shown in Figure 1.

Referring now more particularly to Figure 1: Refrigerated chamber 1 is defined by insulated walls 2 to which access may be had through insulated door 3. Product stack 4 consists of a plurality of egg cases 5 arranged with each egg case separated from adjacent egg cases to provide interstices entirely surrounding each individual case for the circulation of air forming horizontal channels 6 and vertical chimneys 7. Mist forming unit 8 is preferably placed near one end of the stack as in aisle 9. A portion of the side of stack 4 is protected from mist forming unit 8 by shield 10. Shield 10 is mounted upon feet 11 to permit free circulation beneath the shield. Mist forming unit 8 is clearly shown in Figure 2 and consists essentially of a source of water supply as bucket 12 mounted upon pedestal 13. Obviously, bucket 12 may be suitably insulated to delay freezing of the water. Also, hot or warm water may be supplied to bucket 12 and changed before freezing. In storage rooms held at 30° F. the water does not freeze quickly and occasional changes are all that are necessary. Water from bucket 12 is fed to atomizer 14 through hose 15. Compressed air is fed to atomizer 14 through line 16. Atomizer 14 throws a spray of finely divided water into the atmosphere. Fan 17 in housing 18 is driven by motor 19 mounted on pedestal 20. Atomizer 14 is preferably placed near the top and directly in front of fan 17 whereby the blast of air produced by the fan forces the mist produced by atomizer 14 down aisle 9. Circulation in the room is assisted by cold air falling toward the floor from wall refrigerated coils 21. The mist laden air is carried by natural circulation along the floor under the stack thence upwardly through chimneys 7 to the ceiling thence to the side walls to complete the cycle. Numerous eddy currents are, of course, produced by obstacles in the room, and a dispersion takes place through channels 6 from chimneys 7. The high velocity of the air delivered by the fans tends to equalize the temperature and humidity throughout the chamber. To carry out this function of equalization of temperature and humidity I have found it preferable, particularly in egg storage rooms, to keep the fans in operation continuously, although the mist producing unit is in operation only part of the time as has been previously described.

Figure 3:
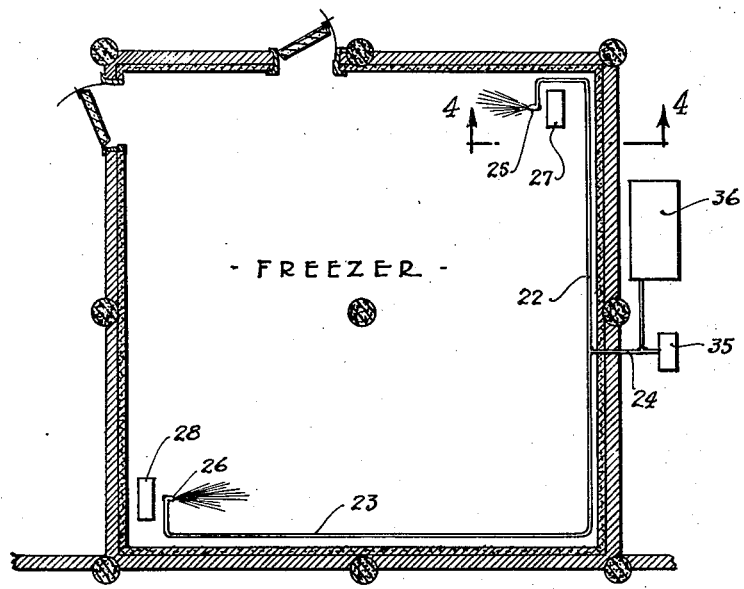
Figure 3 is a plan view of a refrigerated chamber equipped with mist forming equipment particularly adapted for low temperature freezers.

Figure 3 discloses a preferred layout for low temperature freezers, although it will be understood that the layout of Figure 3 may be employed with equal effectiveness in egg storage rooms and that the layout disclosed in Figure 1 may also be employed in low temperature freezers. Since in low temperature freezers it is, as has been pointed out, desirable to maintain a continuous formation of mist, it is preferred in refrigerated chambers of that type to provide a continuous supply of water without constant manual replacement. This is effected in the layout disclosed in Figure 3 through lines 22 and 23 diverging from line 24 and supplying respectively sprays 25 and 26 provided with fans 27 and 28.

Lines 22, 23, and 24 are multiple conduits as shown in cross section in Figure 7.

The wall of the conduit is composed of an insulation preferably formed of two layers of asbestos paper 29, two inches of hair felt 30, and an outer surface of roofing paper 31. At the core of the insulation thus formed, water pipe 32 and compressed air line 33 are placed in parallel contiguous relationship with electrical heating cable 34 which may be thermostatically controlled if desired.

Water is supplied to pipe 32 from flow tank 35 which is more particularly disclosed in Figure 5. Compressed air is supplied to line 33 from the dehumidifying compressor unit 36 more particularly disclosed in Figure 6.

I have found in practice that it is necessary that the water supplied to low temperature rooms be sufficiently high in temperature and sufficiently insulated to prevent freezing at or before the atomizer. I have also found in practice that care must be taken to avoid freezing of the moisture in the compressed air line. I prefer to employ two safeguards against a frozen compressed air line. The first safeguard is the heat supplied by hot water in pipe 32 and by heating element 34. The second safeguard is the dehumidification of the compressed air which removes excessive moisture from the air before it enters the freezer.

Referring now more particularly to Figure 5:

Insulated tank 35 is supplied with water through line 37 passing through valve 38 controlled by float 39 which is regulated to maintain the water at level 40. Water passes into pipe 32 through strainer 41 which is preferably of sixty mesh brass wire cloth, and overflows through pipe 68. By-pass 42 from compressed air line 33 provided with valve 43 may be employed to introduce compressed air into water pipe 32 to clean out the water line and clean the screen. The temperature of the water in tank 35 is maintained at the desired temperature by electrical heater 44 controlled by thermostat 45 provided with bulb 46.

Referring now more particularly to Figure 6 showing dehumidifying compressor unit 36. Air entering through filter 47 passes into air compressor 48 which is of the conventional constant pressure automatic type. Compressed air from the compressor at between thirty to sixty pounds pressure passes through line 49 which is provided with check valve 50 and shut-off valve 51. Compressed air enters tank 52 through nipple 53. Tank 52 is provided with a quantity of calcium chloride solution. Refrigerated brine from brine tank 54 passes through line 55 provided with valve 56 through pump 57 into coil 58 and returns to the brine tank through line 59. Coil 58 serves to refrigerate the calcium chloride solution and renders it effective in removing moisture from the compressed air as it bubbles through the solution. When the unit is started, sufficient calcium chloride solution is placed in tank 52 to bring it to the level indicated at 60. The dehumidified air is drawn off through line 33 provided with shut-off valve 61. After sufficient moisture has been taken up by the calcium chloride solution to bring the level to 62, the calcium chloride solution is withdrawn through valve 63 and a fresh supply of calcium chloride solution of the desired strength is provided through valve 64. The level of calcium chloride solution in the tank 52 may be observed in gauge glass 65 controlled by gauge glass cocks 66 and 67.

In the claims, the term "refrigeration chamber" should be understood to include refrigeration chambers, storage rooms, coolers, and the like maintained at temperatures below the freezing point of water.

I claim:

1. An apparatus for humidifying refrigerated chambers including water spray forming atomizers, means for positive circulation of moisture laden air, an air compressor unit, a source of water supply, compressed air and water supply pipes, and a dehumidifying unit in the compressed air line.

2. The method of humidifying refrigerated chambers which comprises introducing water in the form of a mist at a sufficiently high rate to suspend finely divided supercooled water in the atmosphere of the chamber and positively circulating the moisture laden air in the chamber.

3. The method of humidifying refrigerated chambers which comprises introducing water in the form of a mist at a sufficiently high rate to suspend finely divided supercooled water in the atmosphere of the chamber and positively circulating the moisture laden air in the chamber in sufficient quantities and for a sufficient length of time to satisfy the moisture absorption demands of hygroscopic material present in the chamber.

4. The method of humidifying refrigerated chambers which comprises simultaneously forming finely divided ice particles and finely divided supercooled water in suspension in the atmosphere of the chamber and positively circulating the moisture laden air in the chamber, whereby the atmosphere is humidified by the simultaneous sublimation of ice crystals and evaporation of supercooled moisture.

5. The method of preventing desiccation of meat in freezer storage which comprises simultaneously humidifying the atmosphere by the introduction of finely divided ice crystals and finely divided supercooled water, and forming an incrustation of ice on the surface of the meat by the deposit thereon of preformed finely divided ice crystals and finely divided droplets of supercooled water, and permitting the supercooled water so deposited to crystallize on the surface of the meat.

ANSON W. DE VOUT.